(12) United States Patent
Petton et al.

(10) Patent No.: US 12,071,555 B2
(45) Date of Patent: Aug. 27, 2024

(54) AQUEOUS INKJET INK COMPRISING DISPERSE DYESTUFF

(71) Applicant: Agfa NV, Mortsel (BE)

(72) Inventors: Lionel Petton, Mortsel (BE); Ellen Bertels, Mortsel (BE); Amandine Ligot, Mortsel (BE); Johan Loccufier, Mortsel (BE); Sonny Wynants, Mortsel (BE)

(73) Assignee: Agfa NV, Mortsel (BE)

( * ) Notice: Subject to any disclaimer, the term of this patent is extended or adjusted under 35 U.S.C. 154(b) by 997 days.

(21) Appl. No.: 17/045,444

(22) PCT Filed: Apr. 1, 2019

(86) PCT No.: PCT/EP2019/058151
§ 371 (c)(1),
(2) Date: Oct. 5, 2020

(87) PCT Pub. No.: WO2019/192949
PCT Pub. Date: Oct. 10, 2019

(65) Prior Publication Data
US 2021/0040342 A1     Feb. 11, 2021

(30) Foreign Application Priority Data
Apr. 5, 2018 (EP) .................. 18165838

(51) Int. Cl.
| | | |
|---|---|---|
| C09D 11/00 | (2014.01) | |
| C08K 5/053 | (2006.01) | |
| C08K 5/101 | (2006.01) | |
| C08L 91/00 | (2006.01) | |
| C08L 101/00 | (2006.01) | |
| C09D 11/328 | (2014.01) | |
| C09D 11/38 | (2014.01) | |
| D06P 3/854 | (2006.01) | |
| D06P 5/20 | (2006.01) | |
| D06P 5/24 | (2006.01) | |
| D06P 5/30 | (2006.01) | |

(52) U.S. Cl.
CPC ............ *C09D 11/328* (2013.01); *C08K 5/053* (2013.01); *C08K 5/101* (2013.01); *C08L 91/00* (2013.01); *C08L 101/00* (2013.01); *C09D 11/38* (2013.01); *D06P 3/854* (2013.01); *D06P 5/003* (2013.01); *D06P 5/2077* (2013.01); *D06P 5/30* (2013.01)

(58) Field of Classification Search
CPC ...... C09D 11/328; C09D 11/38; C08K 5/053; C08K 5/101; C08L 91/00; C08L 101/00; D06P 3/854; D06P 5/003; D06P 5/2077; D06P 5/30
USPC ............................ 106/31.01, 31.13, 31.27
See application file for complete search history.

(56) References Cited

U.S. PATENT DOCUMENTS

| | | | | |
|---|---|---|---|---|
| 2002/0166477 | A1* | 11/2002 | Arndt ................. | C09D 11/00 |
| | | | | 106/31.16 |
| 2007/0103528 | A1* | 5/2007 | Pearl ................... | C09D 11/36 |
| | | | | 347/101 |
| 2008/0070009 | A1 | 3/2008 | Akatani et al. | |
| 2015/0116419 | A1 | 4/2015 | Oura et al. | |
| 2016/0264803 | A1* | 9/2016 | Nakamura .......... | C09D 11/103 |

FOREIGN PATENT DOCUMENTS

| | | | |
|---|---|---|---|
| CN | 101376756 A | 3/2009 | |
| CN | 101835618 A | 9/2010 | |
| CN | 102869705 A * | 1/2013 | ............ A61K 8/898 |
| CN | 105960439 A | 9/2016 | |
| EP | 2770030 A1 | 8/2014 | |
| GB | 2037819 A | 7/1980 | |
| JP | 2005-263836 A | 9/2005 | |
| WO | 02/062905 A2 | 8/2002 | |
| WO | 2018/114140 A1 | 6/2018 | |

OTHER PUBLICATIONS

International Search Report dated Apr. 30, 2019 relating to PCT/EP2019/058151, 4 pages.
Written Opinion dated Apr. 30, 2019 relating to PCT/EP2019/058151, 5 pages.
Moody et al., "Color, Dyes, Dyeing, and Printing," *Tufted Carpet*, 15.2.3 Special Colorant Classes re Disperse Dyes (2004).

\* cited by examiner

*Primary Examiner* — James E McDonough
(74) *Attorney, Agent, or Firm* — Leydig, Voit & Mayer, Ltd.

(57) ABSTRACT

An aqueous inkjet ink for textile printing comprising a disperse dyestuff and a glycerol ester of two or three long-chain fatty acids. The invention also includes an inkjet printing method for dyeing fabrics comprising hydrophobic fibres using the above described aqueous inkjet ink.

20 Claims, No Drawings

AQUEOUS INKJET INK COMPRISING DISPERSE DYESTUFF

REFERENCE TO RELATED APPLICATIONS

This application is a 371 National Stage Application of PCT/EP2019/058151, filed Apr. 1, 2019, which claims the benefit of European Application No. 18165838.6, filed Apr. 5, 2018, the contents of which are incorporated by reference herein in their entirety.

TECHNICAL FIELD

The present invention relates to an aqueous inkjet ink comprising a disperse dyestuff as water-insoluble colouring material, for the printing of synthetic substrates such as textile materials and sheets for transfer printing. The invention includes also a recording method, dyeing method and colouring method by means of ink-jetting using said ink composition.

BACKGROUND ART

Disperse dyestuff has been widely used in the industrial dyeing of hydrophobic fibres such as polyesters, where a water-insoluble dye is used for dyeing by dispersing in a dyeing bath or a colouring paste. A dye penetrates and diffuses into a fibre under a high temperature condition, and fixed by means of hydrogen bond, intermolecular force, etc. between the fibre and the dye.

In conventional textile printing using screen, roller and gravure printing processes for applying disperse dyestuffs to synthetic material substrates the disperse dyestuff is dispersed in an aqueous medium by means of a dispersant and the particle size of the disperse dyestuff shows a very broad range due to oversizers of 5 μm and higher. Such particle sizes are unsuitable for application in non-impact ink jet printing since these particles tend to block the small nozzles in the print head.

In order to reduce the tendency to block the nozzles in the ink jet print head the particle size of the disperse dyestuff should be preferably less than 300 nm average diameter but this causes stability problems. Small dispersed particles have the tendency to grow in function of time, a process called Ostwald ripening.

Stability problems are often encountered when the conventional aqueous inks comprising dispersions of disperse dyestuffs are stored over long periods, especially under adverse storage conditions, owing to the growth of the particle sizes of the disperse dyestuff and/or flocculation and/or sedimentation.

Stability can be improved by including polymeric thickeners but this often results in a high viscosity of the print formulation containing the disperse dyestuffs, especially when the disperse dyestuff is present at high concentration. Typical viscosities of conventional aqueous print formulations containing disperse dyestuffs range from 60 to 180 cps measured at 25 C. Such high viscosities are unsuitable for printing by ink jet processes because of the reduction in recovery of the ink in the fine channels and nozzles of the ink jet print head following the ejection of the ink. This occurs when the ink is ejected by both bubble and piezo techniques and results in loss of sharpness of the printed image. For ink jet printing with disperse dyestuffs the aqueous ink formulation should have a viscosity below 40 cps and preferably below 15 cps measured at 25 C.

WO02/062905 discloses ink compositions comprising a disperse dyestuff and an aqueous medium containing a water-miscible co-solvent having a certain degree of polarity in order to reduce crystal growth of the disperse dye stuff. These co-solvents must be present in a high amount in the ink.

US2008/0070009 discloses an aqueous dispersion characterized by comprising a water-insoluble colouring material, water, an anionic dispersing agent, and at least one kind of compounds selected from the group consisting of ethylene oxide adducts of phytosterols and ethylene oxide adducts of cholestanols.

However, none of these ink compositions satisfied the today required settling stability and storage stability of an aqueous inkjet ink comprising disperse dyestuff, as well as the required jetting reliability of an ink composition from an inkjet printer.

SUMMARY OF INVENTION

It is an objective of the invention to provide a solution for the above stated problems. The objective has been achieved by incorporating a fatty acid into the aqueous inkjet ink comprising disperse dyestuff as defined in claim 1.

According to another aspect, the present invention includes a method for inkjet dyeing characterized by fixing a colouring material to the hydrophobic fibre by means of steaming or baking treatment after providing the ink composition according to claim 1 to a hydrophobic fibre by means of an ink jetting as defined in claim 12.

Other features, elements, steps, characteristics and advantages of the present invention will become more apparent from the following detailed description of preferred embodiments of the present invention. Specific embodiments of the invention are also defined in the dependent claims.

DESCRIPTION OF EMBODIMENTS

The ink for inkjet textile printing of the present invention is an ink for inkjet textile printing containing water, a disperse dyestuff, a dispersant and a glycerol ester from two or three long-chain fatty acids.

The glycerol ester from at least two long-chain fatty acids to be used in the present invention is able to stabilise the particles of the disperse dyestuff on storage of the inkjet ink and provide at the same time a stable and reliable jetting behaviour of the inkjet ink. The preferred amount of the glycerol ester from two long-chain fatty acids or three long-chain fatty acids with respect to the weight of the ink composition is from 0.1 wt. % to 6.0 wt. %, more preferably 0.2 wt. % to 4 wt. % most preferably 0.2 wt. % to 2.0 wt. %.

Long-chain fatty acids are carboxylic acids with a hydrocarbon chain having at least 8 carbon atoms, preferably at least 10 carbon atoms and most preferably at least 12 carbon atoms including the carbon atom of the carboxylic acid. The carbon chain can either be saturated or unsaturated and optionally further functionalized with additional functional groups such as hydroxyl groups. Examples of suitable unsaturated long-chain fatty acids to form glycerol esters usable in the invention are: Myristoleic acid Palmitoleic acid, Sapienic acid, Oleic acid, Elaidic acid, Vaccenic acid, Linoleic acid, Linoelaidic acid, α-Linolenic acid, Arachidonic acid, Eicosapentaenoic acid, Erucic acid, and Docosahexaenoic acid. Ricinoleic acid is an example of a further functionalized long-chain fatty acid. Examples of suitable saturated long-chain fatty acids to form glycerol esters usable in the invention are: Myristic acid, Palmitic acid, Stearic acid, Arachidic acid, Behenic acid, Lignoceric acid and Cerotic acid.

Because glycerol ester from two long-chain fatty acids or three long-chain fatty acids appear in nature as mixtures of different glycerol esters from two long-chain fatty acids or three long-chain fatty acids, mixtures of these esters can also be used in the invention. Typical examples are vegetable oils such as avocado oil, canola oil, coconut oil, corn oil, cottonseed oil, linseed oil, hempseed oil, olive oil, palm oil, peanut oil, safflower oil, soybean oil and sunflower oil. The vegetable oils can be (optionally partially) hydrogenated or further derivatized by oxidation giving e.g. oxidized or epoxidized vegetable oils.

Preferable mixtures of glycerol esters from two or three long-chain fatty acids are oxidized rapeseed oil, castor oil and soybean oil.

Disperse Dyestuff

Examples of the disperse dyestuff used in the present invention include an azo dye, an anthraquinone dye, a quinophthalone dye, a styryl dye, an oxazine dye, a xanthene dye, a methine dye, and an azomethine dye. Of such dyes, examples of a yellow disperse dyestuff include "C.I.Disperse Yellow 3, 4, 5, 7, 9,13, 23, 24, 30, 33, 34, 42, 44, 49, 50, 51, 54, 56, 58, 60, 63, 64, 65, 66, 68, 71, 74, 76, 79, 82, 83, 85, 86, 88, 90, 91, 93, 98, 99, 100, 104, 108, 114, 116, 118, 119, 122, 124, 126, 135, 140, 141, 149, 160, 162, 163, 164, 165, 179, 180, 182, 183, 184, 186, 192, 198, 199, 201, 202, 204, 210, 211, 215, 216, 218, 224, 227, 231and 232. Examples of an orange disperse dye stuff include "C.I.Disperse Orange 1, 3, 5, 7,11, 13, 17, 20, 21, 25, 29, 30, 31, 32, 33, 37, 38, 42, 43, 44, 45, 46, 47, 48, 49, 50, 53, 54, 55, 56, 57, 58, 59, 61, 62, 66, 71, 73, 76, 78, 80, 89, 90, 91, 93, 96, 97, 119, 127, 130, 139, 142 and 155. Examples of a red disperse dye stuff include "C.I.Disperse Red 1, 4, 5, 7, 11, 12, 13, 15, 17, 27, 43, 44, 50, 52, 53, 54, 55, 56, 58, 59, 60, 65, 67.1, 72, 73, 74, 75, 76, 78, 81, 82, 86, 88, 90, 91, 92, 93, 96, 103, 105, 106, 107, 108, 110, 111, 113, 117, 118, 121, 122, 126, 127, 128, 131, 132, 134, 135, 137, 143, 145, 146, 151, 152, 153, 154, 157, 159, 164, 167, 169, 177, 179, 181, 183, 184, 185, 188, 189, 190, 191, 192, 200, 201, 202, 203, 205, 206, 207, 210, 221, 224, 225, 227, 229, 239, 240, 257, 258, 277, 278, 279, 281, 288, 298, 302, 303, 310, 311,312, 320, 324, 328 and 343. Examples of a blue disperse dye stuff include C.I. Disperse Blue 3, 7, 9, 14, 16,19,20, 26, 27, 35, 43, 44, 54, 55, 56, 58, 60, 62, 64, 71, 72, 77, 73, 75, 79, 81, 82, 83, 87, 91, 93, 94, 95, 96, 102, 106, 108, 112, 113, 115, 118, 120,122, 125, 128, 130, 139, 141, 142, 143, 146, 148, 149, 153,154, 158, 165, 167, 171, 173, 174, 176, 181, 183, 185, 186, 187,189, 197, 198, 200, 201, 205, 207, 211, 214, 224, 225, 257, 259, 267, 268, 270, 281, 284, 285, 287, 288, 291, 293, 295, 297, 301, 315, 330, 333, 354, 359, 360, 366 and 367. Most preferably, Disperse Blue 359 as disperse dyestuff for the aqueous inkjet ink of the invention, is used. Examples of other disperse dyestuff include "C.I. Disperse Violet 1, 4, 8, 23, 26, 27, 28, 31,33, 35, 36, 38, 40, 43, 46, 48, 50, 51, 52, 56, 57, 59, 61, 63, 69, 77 and 93. Examples of a black disperse dye, which are not particularly limited, include C.I. Disperse Black 1, 3, 10, and 24.Examples of types of dyes other than the above-described dyes include "C.I. Solvent Yellow 160" and 163, and "C.I.Vat Red 41".

Generally, these disperse dyestuff preferably are contained in an amount of 0.2 to 12 wt. %, and more preferably 0.5 to 10 wt. %, with respect to the total mass of the ink, because the dispersion stability can be maintained and the required print density can be achieved.

Dispersant

The inkjet ink composition according to the invention includes a dispersant. The dispersion stability of the dye in the ink jet ink is improved, and the storage stability of the ink jet ink composition for sublimation transfer and the discharging stability of the ink for sublimation transfer over a long period of time are improved. Examples of the dispersant, which are not particularly limited, include an anionic dispersant, a nonionic dispersant, and a polymer dispersant.

Examples of the anionic dispersant, which are not particularly limited, include a salt of aromatic sulfonic acid (for example, a sodium salt, the same shall apply hereinafter), a salt of formalin condensate and β-naphthalene sulfonic acid, a salt of formalin condensate, and alkyl naphthalene sulfonic acid, a salt of formalin condensate and creosote oil sulfonic acid, or a formalin condensate.

Examples of the salt of aromatic sulfonic acid, which are not particularly limited, include creosote oil sulfonic acid, cresol sulfonic acid, phenol sulfonic acid, β-naphthol sulfonic acid, alkyl naphthalene sulfonic acids such as methyl naphthalene sulfonic acid and butyl naphthalene sulfonic acid, a mixture of β-naphthalene sulfonic acid and β-naphthol sulfonic acid, a mixture of cresol sulfonic acid and 2-naphthol-6-sulfonic acid, and lignin sulfonic acid.

Examples of the nonionic dispersant, which are not particularly limited, include an ethylene oxide adduct of phytosterol and an ethylene oxide adduct of cholestanol.

Examples of the polymer dispersant, which are not particularly limited, include polyacrylic acid partial alkyl ester, polyalkylene polyamine, polyacrylate, a styrene acrylic acid copolymer, and a vinyl naphthalene-maleic acid copolymer. More preferably dispersants according to combination copolymers based on at least one copolymerisate comprising optionally substituted styrene and maleic anhydride units that have the combinations of the structural units I to X as disclosed in column 2 to 4 of U.S. Pat. No. 8,129,476 B2.

Moreover, the dispersant may be used alone or two or more kinds may be used in combination.

The content of the dispersant is preferably 1 to 200 wt. %, more preferably 10 to 150 wt. %, most preferably 50 to 150 wt. % with respect to the total amount of the disperse dye stuff included in the ink jet ink composition of the invention. When the content of the dispersant is in the above-described range, there is a tendency that the dispersion stability of the disperse dyestuff is further improved.

Water-Miscible Solvent

The aqueous inkjet ink according to the invention may contain a water-miscible organic solvent. In the present invention this can include glycerin, diglycerin, polyglycerin, ethylene glycol, diethylene glycol, triethylene glycol, polyethylene glycol, propylene glycol, 1,3-propanediol, dipropylene glycol, tripropylene glycol, polypropylene glycol, 2-pyrrolidone, N-methylpyrrolidone, dimethyl sulfoxide, and sulfolane.

From the water-miscible organic solvents, it is preferable to use glycerin, diethylene glycol, triethylene glycol, polyethylene glycol (average molecular weight of 200 to 600), dipropylene glycol, and tripropylene glycol, and more preferably glycerin, diethylene glycol, and dipropylene glycol, from the viewpoint of moisturizing properties. Of these solvents, glycerin is particularly preferable.

Other examples include propylene glycol, dipropylene glycol, 1,3-propanediol, 1,2-butanediol, 1,3-butanediol, 1,4-butanediol, 2,3-butanediol, 3-methyl-1, 3-butanediol, 1,2-pentanediol, 1,5-pentanediol, 2-methyl-2, 4-pentanediol, 3-methyl-1, 5-pentanediol, 1,2-hexanediol and 1,6-hexanediol.

Examples of the glycol ether include monoalkyl ethers of glycol selected from ethylene glycol, diethylene glycol, triethylene glycol, propylene glycol, dipropylene glycol, and tripropylene glycol. More specifically, triethylene glycol monomethyl ether, triethylene glycol monobutyl ether, and dipropylene glycol monopropyl ether can be preferably exemplified. These solvents may be used alone or in combination of two or more.

These water-miscible organic solvents preferably are contained in an amount of 1 to 50 wt. %, more preferably 30 to 45 wt. %, and particularly preferably 30 to 40 wt. %, with respect to the total mass of the ink, from the viewpoint of the viscosity adjustment of the ink and the prevention of clogging of nozzles of the inkjet print head by the moisturizing effect.

Surfactant

To adjust the surface tension of the ink, a surfactant can be used, and examples thereof include anionic surfactants, amphoteric surfactants, cationic surfactants, and non-ionic surfactants.

Examples of the anionic surfactant include alkyl sulfocarboxylate, α-olefin sulfonate, polyoxyethylene alkyl ether acetate, N-acylamino acid and salt thereof, N-acylmethyl taurine salt, alkyl sulfate polyoxy alkyl ether sulfate, alkyl sulfate polyoxyethylene alkyl ether phosphate, rosin acid soap, sulfate esters of castor oil, lauryl alcohol sulfate ester, alkyl phenol type phosphate ester, alkyl-type phosphate ester, alkyl aryl sulfonate, diethyl sulfosuccinate, diethyl hexyl sulfosuccinate, and dioctyl sulfosuccinate.

Examples of the amphoteric surfactant include lauryl dimethylaminoacetic acid betaine, 2-alkyl-N-carboxymethyl-N-hydroxyethyl imidazolinium betaine, coconut oil fatty acid amide propyldimethylaminoacetic acid betaine, polyoctylpolyaminoethylglycine, and other imidazoline derivatives thereof.

Examples of the cationic surfactant include 2-vinylpyridine derivatives and poly 4-vinylpyridine derivatives. Further examples of cationic surfactants are quaternary ammonium salts of long chain aliphatic tertiary amines such as cetyl trimethyl ammonium bromide, cetyl dimethyl benzyl ammonium chloride and hydroxyethyl dimethyl dodecyl ammonium chloride and quaternary salts of nitrogen containing heteroaromatic rings such as hexadecyl pyridinium bromide and quaternized imidazoles and benzimidazoles. Other examples are protonated long chain aliphatic amines such as the hydrochloric acid salt of dimethyl hexadaceyl amine and the toluene sulfonic acid salt of diethyl dodecyl amine.

Examples of the nonionic surfactant include ether based surfactants such as polyoxyethylene nonylphenyl ether, polyoxyethylene octyl phenyl ether, polyoxyethylene dodecyl phenyl ether, polyoxyethylene oleyl ether, polyoxyethylene lauryl ether, and polyoxyethylene alkyl ether; ester-based surfactants such as polyoxyethylene oleic acid ester, polyoxyethylene distearate, sorbitan laurate, sorbitan monostearate, sorbitan monooleate, sorbitan sesquioleate, polyoxyethylene monooleate, and polyoxyethylene stearate; and acetylene glycol (alcohol)-based surfactants such as 2,4,7,9-tetramethyl-5-decyne-4,7-diol, 3,6-dimethyl-4-octyne-3,6-diol, and 3,5-dimethyl-1-hexyne-3-ol.

Inkjet Ink Set

It is further a preferred embodiment of the invention, that an aqueous inkjet ink set is made wherein at least one of its inks is an aqueous ink containing a dispersed dyestuff, a dispersant and a glycerol ester of two or three long-chain fatty acids.

More preferably, the cyan ink of a CMY or CMYK inkjet ink set is an aqueous ink containing a dispersed dyestuff, a dispersant and a glycerol ester of two or three long-chain fatty acids.

Method of Preparation of a Disperse Dye Stuff Dispersion

In a preferred embodiment of the invention, the glycerol ester of two or three long-chain fatty acids can be added into the ink composition as an additive. In another embodiment of the invention, the glycerol ester from 2 or 3 long-chain fatty acids is added during the preparation of the disperse dyestuff dispersion. The presence of the glycerol ester in the dispersion prevent further growth of the disperse dyestuff pfarticles after their milling and dispersing.

If the glycerol ester from 2 or 3 long-chain fatty acids is added during the preparation of the disperse dyestuff dispersion, a primary dispersion is made wherein the disperse dye stuff, the dispersant, preferably a polymeric dispersant and the glycerol ester from 2 or 3 long-chain fatty acids are added to water under mixing. When all ingredients have been mixed, the primary dispersion is fed to a dispersing/milling equipment, preferably a ball mill or sand mill where the primary dispersion is pulverized and dispersed. An aqueous disperse dye stuff dispersion including the glycerol ester from 2 or 3 long-chain fatty acids is thus obtained.

Inkjet Recording Method

A method of inkjet recording, more particularly of inkjet textile printing using the ink of the present invention as described above can be performed as follows. First, the ink for inkjet textile printing is set in a piezo-type, thermal-type or continuous inkjet printer and then can be ejected on a fabric comprising hydrophobic fibres such as polyester fibres. Onto the hydrophobic fibres, a pre-treatment may have been applied to prevent blur. After the jetting step, the fabric is optionally heated to dry the image, followed by heating the printed fabric at a temperature from 150° C. to 220° C. for 0.5 to 15 minutes. Several means of heating can be used, but preferably calendering and steam heating is used. The hydrophobic fibres, such as polyester fibres are dyed with the disperse dyestuff of the ink. Thereafter the non-fixed disperse dyestuff, the additives such as a dispersant, the pre-treatment agent, the glycerol ester from 2 or 3 long-chain fatty acids may be removed by washing or reduction cleaning and washing with water. After drying the fabric, a dyed product on which an image is printed is provided.

The inkjet recording method according to the invention may also comprise a transferring step to a fabric or an object coated with e.g. PES, using an intermediate transfer medium. As the intermediate transfer medium, which is not particularly limited, for example, paper such as plain paper or a recording medium provided with an ink absorbing layer (which is referred to as paper for exclusive use for ink jet or coated paper) can be used. Among these, paper provided with an ink absorbing layer which is formed of inorganic fine particles such as silica is preferable. In the process of drying the ink jet ink composition for sublimation transfer attached to the intermediate transfer medium, it is possible to obtain the intermediate transfer medium in which bleeding is suppressed, and in the following transferring step, there is a tendency that the sublimation of the disperse dye proceeds more smoothly.

The transferring step is a step of transferring the disperse dyestuff included in the ink jet ink composition to a fabric or an object coated with e.g. PES, by heating in a state in which a surface of the intermediate transfer medium on which the ink jet ink according to the invention has been jetted and a surface of the fabric or an object coated with e.g. PES face each other.

The heating temperature in the transferring step, which is not particularly limited, is preferably 160° C. to 220° C., and more preferably 170° C. to 200° C. When the heating temperature is in the above-described range, there is a tendency that the energy required for transferring can be smaller and the productivity of the recorded matter is improved.

The heating time in the step, which also depends on the heating temperature, is 30 seconds to 90 seconds, and more preferably 45 seconds to 60 seconds. When the heating time is in the above-described range, there is a tendency that the energy required for transferring can be smaller and the productivity of the recorded matter is improved.

EXAMPLES

Measurement Methods
1. Particle Size

The particle size of the disperse dye stuff in the aqueous inkjet inks was measured by photon correlation spectroscopy at a wavelength of 633 nm with a 4 mW HeNe laser on a diluted sample of the ink. This was done using a Nicomp 380 available from Particle Sizing Systems.

2. Storage Stability

The storage stability of the ink was evaluated numerically. The storage stability of a disperse dyestuff containing ink is largely determined by the growth of the disperse dyestuff particles on storage. When comparing the particle size after 1 week accelerated ageing at 60° C. and the particle size after 2 weeks accelerated ageing at 60° C., the stability of the ink was judged OK if the relative change in particle size of the disperse dye stuff was less than 10%. If the relative change was more than 10%, stability was judged as not OK.

3. Jetting Reliability

Inks were filtered over a 1 micron filter and tested using a Konica Minolta 1024 MAE-C head at 25° C. and 20 kHz (unless mentioned otherwise). The driving voltage was chosen so as to result in a drop speed of 6 m/s. Each of the inks was ejected for 10 minutes and after 10 minutes 256 nozzles were inspected. Evaluation was done based on the percentage of nozzles that showed aberrant jetting behaviour after 10 minutes of continuous jetting. Examples of aberrant jetting behaviour is the clogging of a nozzle and nozzles which produce 'side shooters', being drops which land on the substrate significantly far in distance from the targeted place. Evaluation criteria are shown in Table 1.

TABLE 1

| A | <10% of missing nozzles + side shooters |
| B | <20% of missing nozzles + side shooters |
| C | ≥20% of missing nozzles + side shooters |

4. Jettability—Open Head Time

Inks were filtered over a 1 micron filter and tested using a Konica Minolta 1024 MAE-C head at 25° C. and 20 kHz (unless mentioned otherwise). The driving voltage was so as to result in a drop speed of 6 m/s. After start up jetting was paused and the set up was left for 10 minutes. After 10 minutes jetting was restarted and 256 nozzles were inspected after this restart. Evaluation was done based on the percentage of nozzles that showed aberrant jetting behaviour after 10 minutes of pausing. Evaluation criteria are shown in Table 2.

TABLE 2

| A | <10% of missing nozzles + side shooters |
| B | >10% of missing nozzles + side shooters |

Materials

All materials used in the following examples were readily available from standard sources such as Sigma-Aldrich (Belgium) and Acros (Belgium) unless otherwise specified. The water used was demineralised water.

Disperbyk 2010 supplied by Byk Chemie GMBH
1,2-benzisothiazol-3(2H)-one supplied by Lonza
Disperse Blue 359 supplied by Rialco Ltd
SURF is a 72-76% solution of 2,4,7,9-tetramethyl-5-decyne-4,7 diol in ethylenglycol, manufactured by Air products & Chemicals
GLYC is glycerol
PG is 1,2-propanediol/propyleneglycol as supplied by Caldic Chemie
PYR is 2-pyrrolidone
BRS is oxidized rapeseed oil REMB 8P, supplied by Oleon
CO is castor oil
SSO is soya stand oil, supplied by Oleon Example 1

This example illustrates the influence of glycerol ester of two or three long-chain fatty acids on the dispersion stability. The glycerol ester does decrease the relative growth of the particle size and improves ink storage stability.

Preparation of the Disperse Dyestuff Dispersion DISP 1 to 3.

DISP 1

93.75 g of Disperbyk 2010, 1.2 g of a 5 wt. % solution of 1,2-benzisothiazol-3(2H)-one, potassium salt in water and 75.0 g of Disperse Blue 359 were mixed into 130.05 g of water using a DISPERLUX™ dispenser. Stirring was continued for 30 minutes. The vessel was connected to a DynoMill-RL mill filled with 200 g of 0.4 mm yttrium stabilized zirconia beads ("high wear resistant zirconia grinding media" from TOSOH Co.). The mixture was circulated over the mill for 194 minutes with a rotation speed of 4500 t/min. During the complete milling procedure the content in the mill was cooled to keep the temperature below 60° C. After milling, the dispersion was discharged into a vessel. The resulting concentrated disperse dyestuff dispersion exhibited an average particle size of 214 nm as measured with a Malvern™ nano-S and a viscosity of 677 mPa·s and at 25° C. at a shear rate of 10 $s^{-1}$.

DISP 2

93.75 g of Disperbyk 2010, 1.2 g of a 5 wt. % solution of 1,2-benzisothiazol-3(2H)-one, potassium salt in water, 75.0 g of Disperse Blue 359 and 12.0 g of CO were mixed into 118.05 g of water using a DISPERLUX™ dispenser. Stirring was continued for 30 minutes. The vessel was connected to a DynoMill-RL mill filled with 200 g of 0.4 mm yttrium stabilized zirconia beads ("high wear resistant zirconia grinding media" from TOSOH Co.). The mixture was circulated over the mill for 194 minutes with a rotation speed of 4500 t/min. During the complete milling procedure the content in the mill was cooled to keep the temperature below 60° C. After milling, the dispersion was discharged into a vessel. The resulting concentrated pigment dispersion exhibited an average particle size of 193 nm as measured with a Malvern™ nano-S and a viscosity of 266 mPa·s at 25° C. and at a shear rate of 10 $s^{-1}$.

DISP 3

93.75 g of Disperbyk 2010, 1.2 g of a 5 wt. % solution of 1,2-benzisothiazol-3(2H)-one, potassium salt in water, 75.0 g of Disperse Blue 359 and 12.0 g of BRS were mixed into 118.05 g of water using a DISPERLUX™ dispenser. Stirring was continued for 30 minutes. The vessel was connected to a DynoMill-RL mill filled with 200 g of 0.4 mm yttrium stabilized zirconia beads ("high wear resistant zirconia grinding media" from TOSOH Co.). The mixture was circulated over the mill for 194 minutes with a rotation speed of 4500 t/min. During the complete milling procedure the content in the mill was cooled to keep the temperature below 60° C. After milling, the dispersion was discharged into a vessel. The resulting concentrated pigment dispersion exhibited an average particle size of 184 nm as measured with a Malvern™ nano-S and a viscosity of 600 mPa·s at 25° C. and at a shear rate of 10 s$^{-1}$.

Preparation of Cyan Inkjet Inks INK 1 to 11

Table 3 shows the composition of the inkjet inks Ink 1 to 11. The inks were prepared by adding the components into a recipient in the order given, while stirring with a magnetic stirrer. Ink 1 only contains 5 wt. % of disperse dyestuff (and thus results in a lower optical density when applying the same amount of ink to a substrate), Ink 2 is a comparative, while Ink 3 is the comparative ink with some glycerol replaced by pyrrolidone. Inks 4 up to 9 were formulated by adding the glycerol ester of two or three long-chain fatty acids to the inks as a separate ingredient, while for Ink 10 and 11 the glycerol ester of two or three long-chain fatty acids where added while preparing/milling the dispersion of the disperse dyestuff.

TABLE 3

| | Ink composition in wt. % Ink | | | | | | | | | | |
|---|---|---|---|---|---|---|---|---|---|---|---|
| | Ink 1 COMP | Ink 2 COMP | Ink 3 COMP | Ink 4 INV | Ink 5 INV | Ink 6 INV | Ink 7 INV | Ink 8 INV | Ink 9 INV | Ink 10 INV | Ink 11 INV |
| Water | Balance to 100% | Balance to 100% | Balance to 100% | Balance to 100% | Balance to 100% | Balance to 100% | Balance to 100% | Balance to 100% | Balance to 100% | Balance to 100% | Balance to 100% |
| SURF | 0.67 | 0.67 | 0.67 | 0.67 | 0.67 | 0.67 | 0.67 | 0.67 | 0.67 | 0.67 | 0.67 |
| PG | 20 | 13 | 13 | 13 | 13 | 13 | 13 | 13 | 13 | 13 | 13 |
| GLYC | 22 | 20 | 17 | 20 | 20 | 20 | 20 | 20 | 20 | 20 | 20 |
| PYR | | | 3 | | | | | | | | |
| BRS | | | | 0.5 | 2 | | | | | | |
| CO | | | | | | 0.5 | 2 | | | | |
| SSO | | | | | | | | 0.5 | 2 | | |
| DISP 1 | 20 | 24 | 24 | 24 | 24 | 24 | 24 | 24 | 24 | | |
| DISP 2 | | | | | | | | | | 24 | |
| DISP 3 | | | | | | | | | | | 24 |

Inks from Table 3 were evaluated for storage stability, as shown in Table 4. Glycerol esters of two or three long-chain fatty acids do improve ink storage stability.

TABLE 4

| Ink | Storage stability |
|---|---|
| Ink 1 | not OK |
| Ink 2 | not OK |
| Ink 3 | OK |
| Ink 4 | OK |
| Ink 5 | OK |
| Ink 6 | OK |
| Ink 7 | OK |
| Ink 8 | OK |
| Ink 9 | OK |

TABLE 4-continued

| Ink | Storage stability |
|---|---|
| Ink 10 | OK |
| Ink 11 | OK |

Example 2

This example illustrates the influence of glycerol esters of two or three long-chain fatty acids on the jetting behaviour of an ink.

Evaluation and Results

Inks Ink 1 to 7 were evaluated according to Jetting Reliability (see § 3.), except for Ink 1, which was evaluated at 30° C. on a Kyocera KJ4B print head, using identical criteria as for the Konica Minolta 1024 MAE-C print head. From Table 5 it can be seen that increasing the disperse dyestuff amount in the ink (Ink 1 vs. Ink 2) to increase the optical density of the ink, does decrease reliability. Although the addition of pyrrolidone (Ink 3) can improve the open head time, the reliability of this INK 3 is not acceptable.

Addition of glycerol esters of two or three long-chain fatty acids, clearly improves reliability.

TABLE 5

| Ink | Ink 1 | Ink 2 | Ink 3 | Ink 4 | Ink 5 | Ink 6 | Ink 7 |
|---|---|---|---|---|---|---|---|
| Jetting Reliability | A | C | C | A | B | A | B |

Example 3

This example illustrates the influence of glycerol esters of two or three long-chain fatty acids on the open head time of an ink.

Evaluation and Results

Inks Ink 1 to Ink 7 were evaluated according to Jetting Reliability—open head time (see § 4.), except for Ink 1, which was evaluated at 30° C. on a Kyocera KJ4B print head, using identical criteria as for the Konica Minolta 1024

MAE-C print head. From Table 6, it can be seen that increasing the disperse dyestuff amount in the ink (Ink 1 vs. Ink 2) to improve the ink density decreases the open head time. Addition of pyrrolidone (Ink 3) can improve the open head time, but does not improve Jetting Reliability). Addition of glycerol esters of two or three long-chain fatty acids clearly improves the open head time.

TABLE 6

| Ink | Ink 1 | Ink 2 | Ink 3 | Ink 4 | Ink 5 | Ink 6 | Ink 7 |
|---|---|---|---|---|---|---|---|
| open head time | A | B | A | A | A | A | A |

The invention claimed is:

1. An inkjet recording method comprising the following steps:
   a) jetting an aqueous inkjet ink comprising a disperse dyestuff, a dispersant, and a glycerol ester of two or three long-chain fatty acids onto a fabric comprising hydrophobic fibres to obtain an image comprising the disperse dyestuff; and
   b) applying heat to the fabric to fix the disperse dye stuff onto the hydrophobic fibres.

2. An inkjet recording method comprising the following steps:
   a) jetting an aqueous inkjet ink comprising a disperse dyestuff, a dispersant, and a glycerol ester of two or three long-chain fatty acids onto a transfer medium to obtain an image comprising the disperse dyestuff; and
   b) bringing the transfer medium into contact with a fabric comprising hydrophobic fibres; and
   c) applying heat to the transfer medium and/or the fabric to fix the disperse dyestuff onto the hydrophobic fibres.

3. The method of claim 1, wherein the aqueous inkjet ink further comprises a water-miscible solvent.

4. The method of claim 1, wherein an amount of the glycerol ester with respect to a total weight of the inkjet ink is from 0.2 wt. % to 6.0 wt. %.

5. The method of claim 3, wherein an amount of the glycerol ester with respect to a total weight of the inkjet ink is from 0.2 wt. % to 6.0 wt. %.

6. The method of claim 1, wherein the glycerol ester is selected from the group consisting of oxidized rapeseed oil, castor oil, soybean oil, and mixtures thereof.

7. The method of claim 3, wherein the glycerol ester is selected from the group consisting of oxidized rapeseed oil, castor oil, soybean oil, and mixtures thereof.

8. The method of claim 4, wherein the glycerol ester is selected from the group consisting of oxidized rapeseed oil, castor oil, soybean oil, and mixtures thereof.

9. The method of claim 1, wherein the disperse dyestuff is a blue disperse dye.

10. The method of claim 9, wherein the blue disperse dye is selected from the group consisting of C.I. Disperse Blue 3, 7, 9, 14, 16, 19, 20, 26, 27, 35, 43, 44, 54, 55, 56, 58, 60, 62, 64, 71, 72, 77, 73, 75, 79, 81, 82, 83, 87, 91, 93, 94, 95, 96, 102, 106, 108, 112, 113, 115, 118, 120, 122, 125, 128, 130, 139, 141, 142, 143, 146, 148, 149, 153, 154, 158, 165, 167, 171, 173, 174, 176, 181, 183, 185, 186, 187, 189, 197, 198, 200, 201, 205, 207, 211, 214, 224, 225, 257, 259, 267, 268, 270, 281, 284, 285, 287, 288, 291, 293, 295, 297, 301, 315, 330, 333, 354, 359, 360, 366, 367, and mixtures thereof.

11. The method of claim 1, wherein the dispersant is a polymer.

12. The method of claim 2, wherein the aqueous inkjet ink further comprises a water-miscible solvent.

13. The method of claim 2, wherein an amount of the glycerol ester with respect to a total weight of the inkjet ink is from 0.2 wt. % to 6.0 wt. %.

14. The method of claim 12, wherein an amount of the glycerol ester with respect to a total weight of the inkjet ink is from 0.2 wt. % to 6.0 wt. %.

15. The method of claim 2, wherein the glycerol ester is selected from the group consisting of oxidized rapeseed oil, castor oil, soybean oil, and mixtures thereof.

16. The method of claim 12, wherein the glycerol ester is selected from the group consisting of oxidized rapeseed oil, castor oil, soybean oil, and mixtures thereof.

17. The method of claim 13, wherein the glycerol ester is selected from the group consisting of oxidized rapeseed oil, castor oil, soybean oil, and mixtures thereof.

18. The method of claim 2, wherein the disperse dyestuff is a blue disperse dye.

19. The method of claim 18, wherein the blue disperse dye is selected from the group consisting of C.I. Disperse Blue 3, 7, 9, 14, 16, 19, 20, 26, 27, 35, 43, 44, 54, 55, 56, 58, 60, 62, 64, 71, 72, 77, 73, 75, 79, 81, 82, 83, 87, 91, 93, 94, 95, 96, 102, 106, 108, 112, 113, 115, 118, 120, 122, 125, 128, 130, 139, 141, 142, 143, 146, 148, 149, 153, 154, 158, 165, 167, 171, 173, 174, 176, 181, 183, 185, 186, 187, 189, 197, 198, 200, 201, 205, 207, 211, 214, 224, 225, 257, 259, 267, 268, 270, 281, 284, 285, 287, 288, 291, 293, 295, 297, 301, 315, 330, 333, 354, 359, 360, 366, 367, and mixtures thereof.

20. The method of claim 2, wherein the dispersant is a polymer.

* * * * *